(12) United States Patent
Bornitz

(10) Patent No.: US 7,819,317 B2
(45) Date of Patent: Oct. 26, 2010

(54) BULK PROOF OF DELIVERY

(75) Inventor: Carrie A. Bornitz, Alexandria, VA (US)

(73) Assignee: United States Postal Service, Washington, DC (US)

( * ) Notice: Subject to any disclaimer, the term of this patent is extended or adjusted under 35 U.S.C. 154(b) by 0 days.

(21) Appl. No.: 10/952,174

(22) Filed: Sep. 29, 2004

(65) Prior Publication Data

US 2005/0184152 A1    Aug. 25, 2005

Related U.S. Application Data

(60) Provisional application No. 60/509,410, filed on Oct. 7, 2003.

(51) Int. Cl.
*G06F 19/00* (2006.01)
(52) U.S. Cl. ...................... 235/385; 235/380
(58) Field of Classification Search ................. 235/375, 235/385, 380; 705/400–411, 24, 1
See application file for complete search history.

(56) References Cited

U.S. PATENT DOCUMENTS

| | | | | |
|---|---|---|---|---|
| 4,887,208 A | * | 12/1989 | Schneider et al. | ............. 705/28 |
| 5,313,051 A | * | 5/1994 | Brigida et al. | ............... 235/375 |
| 5,377,120 A | * | 12/1994 | Humes et al. | ................ 700/224 |
| 5,684,705 A | * | 11/1997 | Herbert | ....................... 705/401 |
| 5,770,841 A | * | 6/1998 | Moed et al. | .................. 235/375 |
| 6,275,745 B1 | * | 8/2001 | Critelli et al. | ............... 700/227 |
| 6,285,916 B1 | * | 9/2001 | Kadaba et al. | ............. 700/222 |
| 6,690,775 B2 | * | 2/2004 | Okamura | ................. 379/93.24 |
| 6,865,560 B1 | * | 3/2005 | Sansone et al. | ............. 705/404 |
| 2004/0030572 A1 | * | 2/2004 | Campbell et al. | .............. 705/1 |
| 2005/0169224 A1 | * | 8/2005 | Baker et al. | .................. 370/342 |

OTHER PUBLICATIONS

PCT International Search Report dated Oct. 24, 2005 from corresponding International Application No. PCT/US04/32201.

* cited by examiner

*Primary Examiner*—Jamara A Franklin
(74) *Attorney, Agent, or Firm*—Finnegan, Henderson, Farabow, Garrett & Dunner, LLP

(57) ABSTRACT

A method of providing a plurality of proof of mail piece delivery receipts in a single report. A digital memory stores delivery information related to a first mail piece delivery receipt and stores delivery information related to a second mail piece delivery receipt. A processor extracts the delivery information related to the first mail piece delivery receipt and the delivery information related to the second mail piece delivery receipt from the digital memory in accordance with an extraction condition. The processor compiles the extracted delivery information into a single report.

23 Claims, 3 Drawing Sheets

UNITED STATES
POSTAL SERVICE

Date: March 30, 2002

JOHN DOE
PO BOX 12
ANYTOWN US 55555-5555

Dear John Doe:

The following is in response to your March 30, 2002 request for delivery information on you Signature Confirmation item number 2199 7856 4563 7869 9182. The delivery record show that this item was delivered on March 18, 2002 at 10:31 a.m. in Sioux Falls, SD, 57105 to M OLSON. The scanned image of the recipient information is provided below.

| Signature of Recipient: | *Matt Olson* |
| --- | --- |
| | M. Olson |
| Address of Recipient: | 123 Main St. |

Thank you for selecting the Postal Service for your mailing needs. If you require additional assistance, please contact your local post office or Postal Service representative.

Sincerely,

United States Postal Service

Figure 3

BULK PROOF OF DELIVERY

The present application claims priority to U.S. Provisional Patent Application No. 60/509,410, filed on Oct. 7, 2003, the contents of which are expressly incorporated herein by reference.

BACKGROUND OF THE INVENTION

A. Field of the Invention

The present invention relates to proof of a transaction and to a method of and a system for compiling a plurality of proof of transaction receipts into a single report.

B. Description of the Related Art

Service providers may provide service users with proof of transaction receipts. A separate receipt is typically provided for each transaction.

The U.S. Postal Service, for example, allows mailers that purchase Signature Confirmation® service or Express Mail® to request a proof of delivery signature image in letter format on an individual basis, one record at time. These requests are supported via the U.S. Postal Service Internet web site and a 1-800 number. Letters are faxed or mailed upon request. When an Express Mail® or Signature Confirmation® service item is delivered, the U.S. Postal Service keeps a record of the date, time, and location of the delivery and captures the recipient's signature pertaining to the delivery.

SUMMARY OF THE INVENTION

The present invention allows a service provider to compile a plurality of proof of transaction receipts into a single report. This allows the service user to retain data for an extended period of time, reduce handling costs, and receive complete proof of transaction receipts for multiple items.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a method of providing a plurality of proof of transaction receipts in a single report. The method comprises the steps of: storing, in a digital memory, information related to a plurality of proof of transaction receipts; extracting the information related the proof of transaction receipts from the digital memory; and compiling, in a processor, the extracted proof of transaction receipt information into a single report.

The invention further comprises a method of providing a plurality of proof of mail piece delivery receipts in a single report. The method comprises the steps of: storing, in a digital memory, delivery information related to a first mail piece delivery receipt; storing, in the digital memory, delivery information related to a second mail piece delivery receipt; extracting the delivery information related to the first mail piece delivery receipt and the delivery information related to the second mail piece delivery receipt from the digital memory in accordance with an extraction condition; and compiling, in a processor, the extracted delivery information into a single report.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

FIG. 3 is an example of a proof of delivery form including a signature image.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

A service provider may provide proof of transaction receipts to a service user. For example, a delivery service may provide proof of delivery to a customer. The proof of transaction may include a delivery report or a signature receipt. Delivery information and signatures can be captured electronically and stored as digital data and images. Bar code scanners often aid electronic information capture, automatically recording date, time, and place of bar code identified items.

Figure 1:
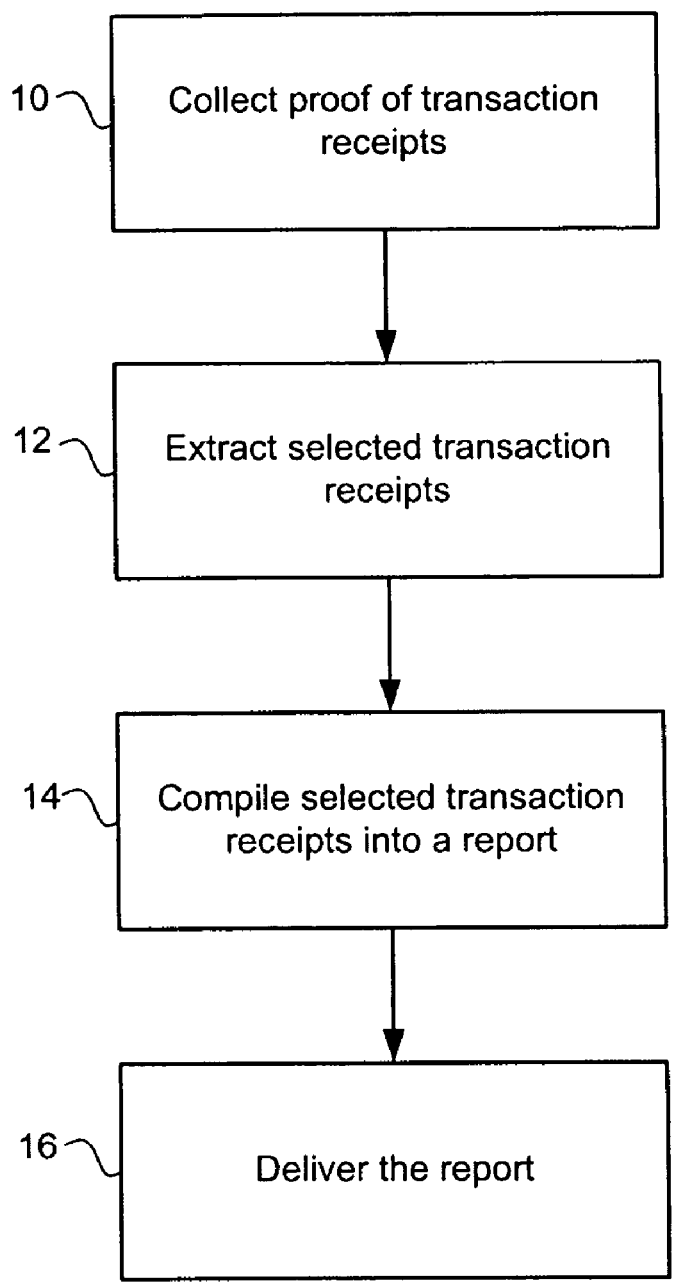
FIG. 1 is a flow chart showing a method of compiling a plurality of proof of transaction receipts into a single report and delivering the report.

The service provider may collect a number of proof of transaction receipts from separate transactions into a storage location, such as a digital memory, as shown in step 10 of FIG. 1. The digital memory may be part of a network, and memory locations may be spread over the network. The separate transactions may be related in some way or could be completely discrete. For example, the separate transactions could all be for one customer or could all relate to one event such as a promotional mailing.

Using an information processing system, the service provider extracts selected transaction receipts from the storage location, as shown in step 12 of FIG. 1. The selection follows one or more predetermined criteria, such as a service user identification, a date range, a job number, or a geographic designation. The selected receipts may number in the tens, hundreds, thousands, tens of thousands, hundreds of thousands, or more. The extraction could occur at set time intervals, such as monthly, twice a month, or weekly. The extraction could occur automatically at, for example, set times or in response to a pre-selected event. For example, extraction could occur after storing a pre-selected number of proof of transaction receipts, or at the completion of a request, or at pre-selected benchmarks toward completion.

Using an information processing system, the service provider compiles the transaction receipts into a single report, as shown in step 14 of FIG. 1. The single report may be, for example, a document, a collection of documents, a computer file, or a collection of computer files. The report allows the service user to retain data for an extended period of time, to reduce handling costs, and to receive complete proof of transaction receipts in bulk.

Machine readable reports may be searchable and may include a number of different searchable fields. In addition, reports may include a table of contents or a chronology to aid data retrieval.

The service provider may deliver the single report to the service user, as shown in step 16 of FIG. 1. The service provider might store the report on a portable storage medium, such as magnetic memory, solid state memory, or optical memory. The report may be stored on an optical disk, such as a compact disk ("CD"). The service provider could then send the portable storage medium to the service user. The service provider may provide the report for download through a computer network. For example, the service provider may place the report in a directory for download by the service user. The service provider might send the report to the service user by electronic mail. Electronic mail allows the electronic delivery of a message and includes Internet electronic mail. The report could thus be automatically compiled and delivered.

Figure 2:
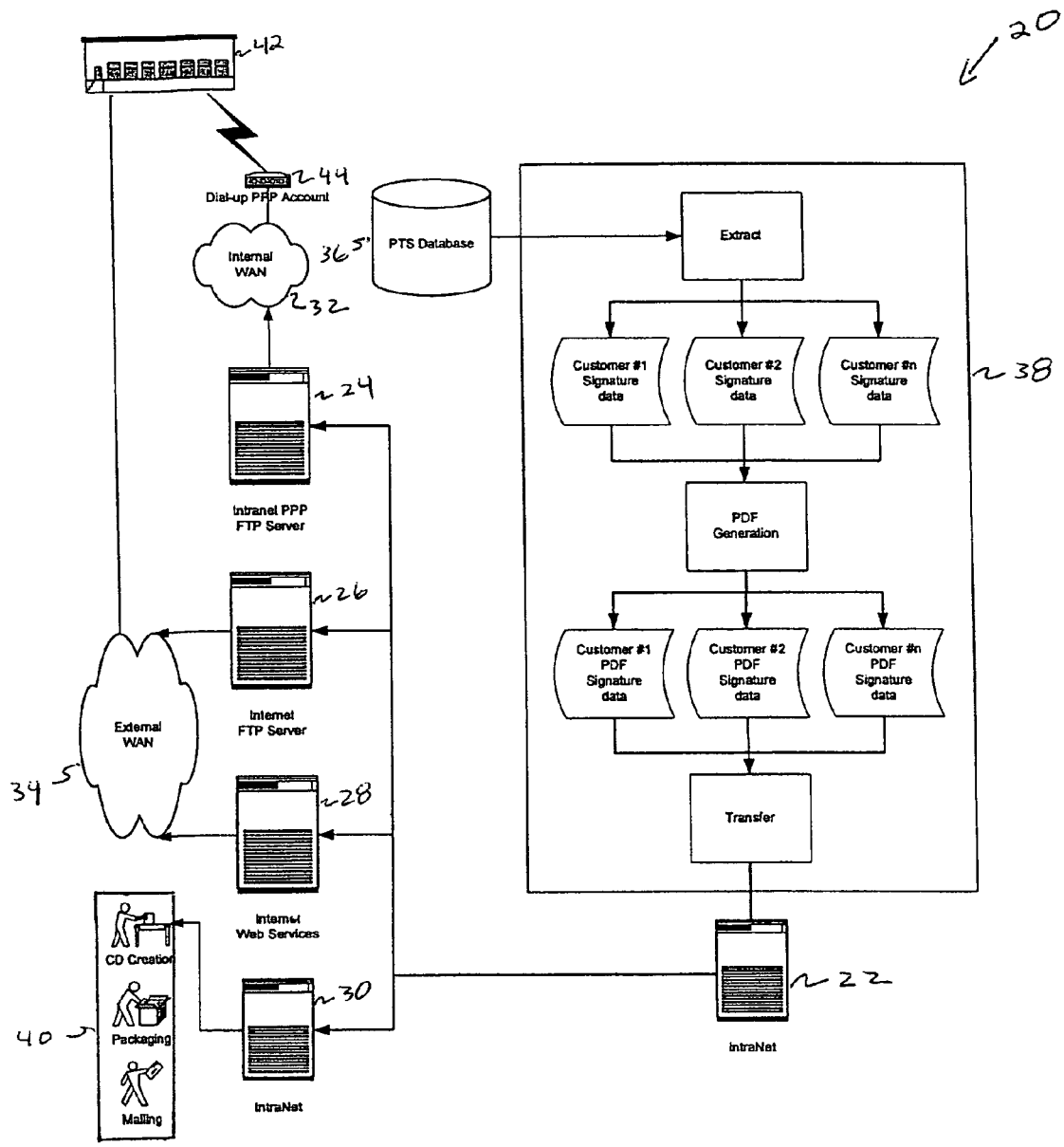
FIG. 2 is a schematic diagram of a computer network configured to compile a plurality of proof of transaction receipts into a single report and deliver the report.

FIG. 2 is a schematic diagram of a computer network configured to compile a plurality of proof of transaction receipts into a single report. The network includes servers 22-30 connected to an external wide area network 34 and an internal wide area network 32.

Proof of receipt information is stored in memory comprising a database 36, such as a Product Tracking System ("PTS") database. The server 22 extracts selected proof of receipt information from the database 36 and executes the process shown in the flow chart of box 38. That processing generates a report in, for example, a portable document format ("pdf") file. The server 22 makes the report available to servers 24, 26, 28, 30 for delivery to the customer.

If the customer requests mail service, a service provider employee at a location 40, connected to server 30, creates an optical disk, packages the optical disk, and mails the package.

If the customer requests a download service, the customer 42 may download the report through the wide area network 34 or through a dial-up account 44.

The invention will be further clarified by the following example from the U.S. Postal Service, which is intended to be purely exemplary of the invention.

Customers of the U.S. Postal Service may request proof of delivery signature images in letter format. The U.S. Postal Service keeps a record of the date, time, and location of a delivery and captures the recipient's signature pertaining to the delivery. The U.S. Postal Service will then deliver that information to the customer.

"The Bulk Proof of Delivery Program" enables mailers to receive proof of delivery records with signatures, in bulk, eliminating the need for single piece or individual record requests. The U.S. Postal Service may collect all of the requested proof of delivery records in one location, such as in a computer or network memory, and may compile all of the individual proof of delivery records into one report, such as a computer file or a collection of computer files. Proof of delivery records can be collected at one time in response to a specific request. Proof of delivery records might also be collected at set intervals, such as once a week, once a month, or twice a month. Such a collection could continue for a fixed length of time or might continue until the customer sends a request to terminate.

The U.S. Postal Service may deliver the bulk records to the customer. Bulk records may be delivered on a portable medium, such as an optical disk, a magnetic memory, or a solid state memory. Bulk records might also be provided through a computer network, for example, by downloading a Signature Extract File using File Transfer Protocol ("FTP").

Mailers may retain bulk records beyond what the U.S. Postal Service provides. For example, the bulk records may be retained on optical disks, such as CDs, or in Signature Extract Files. This information can be downloaded onto, for example, a personal computer or a server. The information may be indexed and searched.

An identification number in a label or an electronic file may provide a unique identifier used to compile records for the Bulk Proof of Delivery service. The identification number might identify a particular customer and allow extraction of all of the proof of delivery receipts for that customer. A customer might have more than one identification number.

A Data Universal Numbering System ("DUNS") number provided by Dun and Bradstreet may be used as the identification number. The U.S. Postal Service may extract information based on the DUNS number in a Package Identification Code ("PIC") or the DUNS Number field and send the information to the mailer or a third-party designee via optical disk or Signature Extract File.

A single mailer may use multiple identification numbers; however, mailers with multiple identification numbers must register each identification number during certification. A mailer can choose whether to receive either optical disks or Signature Extract Files for each registered identification number. The mailer may also choose to consolidate the various records under one identification number.

Within the U.S. Postal Service, the Bulk Proof of Delivery service is available to mailers that participate in the Express Mail® Manifesting program, Signature Confirmation® electronic option program, and mailers that print their own labels using the Signature Confirmation® retail option. Bulk Proof of Delivery service may also be offered to mailers using Return Receipt service with Certified Mail, Registered Mail, Insured Mail, or Collect on Delivery (COD) Mail, with labels that include the mailer's identification number or the identification number of a third-party designee. To participate in the bulk proof of delivery program, a mailer or the mailer's third-party designee must receive the appropriate certification to print labels or send and receive files.

When requesting participation in the Bulk Proof of delivery Service, mailers may: choose between a Signature Extract File or an optical disk; choose whether the mailer or a third-party designee will receive files; choose who will send an electronic file, if applicable; choose a payment method, such as postage meter, PC Postage/Pay at Mailing, or credit card/Pay as Compiled; and choose whether an electronic file will always or will never be sent, if applicable.

Proof of delivery records may be protected or encrypted. A customer specific code may be needed to open a protected or encrypted file. The U.S. Postal Service Product Information Requirements Office may provide such codes. The codes must be entered before access to the information is allowed.

A key code, an example customer specific code, may protect signature data files. After processing and approving a mailer's participation request, the U.S. Postal Service may provide the mailer or the third-party designee with the appropriate information. If the mailer will receive its own records, the U.S. Postal Service Product Information Requirements office may send a message, such a facsimile over the telephone line, with the mailer's key code information to the mailer. If the mailer designates a third party, the U.S. Postal Service may send the mailer's records to the third-party designee using the third-party designee's key code.

A mailer may choose to have a third-party designee receive its records. In those cases, the U.S. Postal Service releases proof of delivery information to the mailer's approved third-party designee. If the mailer does not give approval for a third-party designee, then a third-party designee cannot receive proof of delivery letters on behalf of the mailer. When a mailer joins the Bulk Proof of delivery program and designates a third-party, the U.S. Postal Service may send a message, such a facsimile over the telephone line, to the third-party designee informing the designee of the mailer's activation date for the program.

Each third-party designee has one universal key code for all records it receives, regardless of the number of mailers. When managing records for multiple mailers, the third-party designee preferably separates each mailer's records and provides each mailer with access to only the mailer's records. A third-party designee preferably should not share its universal key code or allow one mailer to access the records of another mailer. The third-party designee places the mailer's identification number in the Package Identification Code ("PIC") or in the Client Identification Number field of an electronic file.

For each individual mailer that a third-party designee represents, the U.S. Postal Service sends to the third-party designee two files, such as pdf files. One file contains all the mailer's proof of delivery records. The other file contains a corresponding table of contents. If the third-party designee requests files on a portable medium, such as an optical disk, both files will be on the portable medium. If the third-party designee requests Signature Extract Files, the U.S. Postal Service will send two separate files. For example, if a third-party designee represents 20 mailers, the third party designee may receive 20 optical disks (if using the portable medium option) or 40 individual pdf files (if using the Signature Extract File option).

A third-party designee who wishes to receive its own delivery records for personal mailings preferably establishes a separate identification number or uses a unique identification number in its PIC and files.

The third-party designee may mail one or more clients' mail using a unique identification number assigned to the client and placing the identification number in the Client Identification Number field. The third-party designee's identification number will appear in a Header Record and in the PIC. Alternatively, the third-party designee may mail one or more clients' mail using a unique identification number assigned to the client and place that number in the PIC. In this case, the third-party designee's identification number appears in the Header Record. In another alternative, the third-party designee may mail its own mailings using a separate identification number assigned to it for this purpose. This identification number appears either in the Header Record of the electronic file or in the Client Identification Number field and also in the PIC.

A mailer may switch to a different third-party designee to receive its records. Upon receiving a request to change to a different third-party designee, the U.S. Postal Service processes the request and sends to the new third-party designee a message, such a as facsimile over the telephone lines, containing the mailer's information. The new third-party designee preferably uses its existing key code to access the mailer's records. The U.S. Postal Service will begin using the new third-party designee's key code to encrypt the mailer's records.

A mailer may switch from having a third-party designee receive its records to receiving its own records. Upon receiving such a request, the U.S. Postal Service processes the request and sends to the mailer a message, such as a facsimile over the telephone lines, containing the mailer's new key code. The U.S. Postal Service will begin using the mailer's new key code to encrypt the mailer's records.

Payment for the Bulk Proof of Delivery Service may be included within certain special services. Alternatively, a mailer might pay an extra fee at the time of mailing or might pay an extra fee at the time a report is compiled.

Letter facsimiles may provide the proof of receipt. FIG. 3 shows an example of a Proof of Delivery letter facsimile 60 on U.S. Postal Service letterhead.

The letter facsimile may show selected data elements, such as the package identification code, the delivery date, the delivery time, the delivery city, the delivery state, the delivery ZIP code, and the recipient's name. The letter facsimile may also show selected images, such as a signature image and an address image. The header section of each letter facsimile identifies the mailer.

An example image capture system will now be described. When a U.S. Postal Service delivery employee delivers a signature-service mail piece, the recipient signs a form. The U.S. Postal Service employee sends this form to a processing center that optically scans the signature and links the image in a Product Tracking System database to the delivery event for that mail piece.

The U.S. Postal Service may then create letter facsimiles for all records with signature images obtained since the last report. For example, the Signature Extract Files that the U.S. Postal Service posts on Monday morning may contain records for any item for which the U.S. Postal Service linked the signature image during the prior week. If the U.S. Postal Service delivered an item on Saturday and the signature image is not yet available, then that record will be included in a future file. In the optical disk production process, if a signature image is not yet available, then the U.S. Postal Service will include that record on a future optical disk. The U.S. Postal Service typically does not provide letters without signature images because they are not considered valid proof of delivery records.

The industry standard and readily available Adobe Acrobat Reader is preferably used to locate, view, and print the indexed letter facsimiles on the optical disk or in the Signature Extract File. Subsequently, all files are preferably in pdf format for use with the Adobe Acrobat Reader. In such a system, customers simply click on the file to open it, enter their customer key, and begin viewing or searching for individual records. Searches can be conducted by article number, delivery date, or recipient's last name (when available).

Letters may be indexed by, for example, PIC, recipient's last name, and delivery date. A separate table of contents file could be provided listing, for example, the PIC, the recipient's last name, the delivery date, and an extract identifier.

As an example, the U.S. Postal Service typically indexes pdf letter facsimiles according to label number, recipient's last name, and delivery date. With each optical disk or Signature Extract File, the U.S. Postal Service preferably provides a separate Table of Contents file that lists the PIC, the recipient's last name (when available), the delivery date, and an Optical Disk/File Identifier. The Table of Contents file is a cumulative file that provides a way to determine where the letter facsimile is stored on the optical disk or Signature Extract File. The mailer can search the cumulative Table of Contents for individual records and then determine which optical disk or Signature Extract File contains the record.

The Optical Disk/File Identifier contains the acronym "pod" for proof of delivery, followed by a two-digit month, two-digit day, and two digit year code indicating a creation date. Additionally a letter of the alphabet is preferably appended for every thousand records. Records 1 through 1,000 are in a file ending with "a," records 1,001 through 2,000 are in a file ending with "b," etc. The generic file name content is thus podmmddyya.pdf. Example file names are "pod060103a.pdf" and "pod060103b.pdf."

The Table of Contents data is also in pdf format and has a similar naming convention, for example, toc060103.pdf.

If a mailer has its data sent to a third-party designee, the mailer's identification number preferably precedes the date of the file. The U.S. Postal Service preferably provides two files for each mailer. One file preferably has all the mailer's records. The other file preferably has the Table of Contents. These files will always begin with the letter "d," to indicate that a Client identification number follows. For example, if a third-party designee has two clients, one with identification number 111111111 and the other with identification number 222222222, and the date of the file is May 15, 2004, and the directory of the third-party designee is mmcABC, the two files would be provided as: d111111111.pod051504a.pdf into a directory mmcABC and as d222222222.pod051504a.pdf into a directory mmcABC. The generic file name content thus is dxxxxxxxxx.podmmddyya.pdf.

The Table of Contents is preferably a cumulative file that contains data for each calendar year. In January of each year, for example, the U.S. Postal Service preferably creates a new Table of Contents, regardless of the date that the mailer started participating in the program. Mailers preferably place a copy of the Table of Contents pdf file on a local personal computer or server to allow unlimited access to the data.

The U.S. Postal Service may provide bulk proof of delivery reports on a portable medium, such as an optical disk, or in a Signature Extract File obtained using File Transfer Protocol ("FTP"). To open the encrypted file, the mailer uses the access key code. If a mailer chooses a third-party designee to receive its records, the third-party designee mailer will provide the mailer with a key code to open its records.

Portable media, such as optical disks, may be processed at set intervals, such as twice a month, and then sent to the mailer through, for example, First-Class Mail.

To receive Signature Extract Files, the mailer or third-party designee preferably has the ability to receive files via dial-up or Internet File Transfer Protocol. The U.S. Postal Service typically prepares Signature Extract Files and Table of Contents files for mailers who retrieve their files electronically via dial up or Internet FTP. Although mailers traditionally use ASCII when they retrieve data such as a Confirmation Services event extract file and an Error/Warning Report, ASCII is not preferred for the bulk proof of delivery pdf files. Files may not be available for download after a set period of time, such as after 30 days.

Bulk Proof of Delivery allows mailers to retain data for extended periods of time. It also reduces handling costs as they need not manually file individual, hardcopy Return Receipts. Further, it also provides Proof of Delivery letters which have complete information such as delivery date, time, and location and recipient's signature as shown in FIG. 3. Bulk proof of delivery thus eliminates the need to request Proof of Delivery individually via internet or 1-800 (or other toll free) number and eliminates hardcopy filing. The data may be searchable by Article number, date, and Recipient's last name (when available). The access to this information is protected by a Password and a Customer key. The files are encrypted for security and are viewable using Adobe Acrobat Reader. Bulk Proof of Delivery thus provides legal documentation, unlimited retention, ease of access, and reduction in handling costs.

Embodiments of the present invention have included processors and computer readable media that perform steps in a method of providing a plurality of transaction receipts in a single report. Examples of computer readable media, consistent with embodiments of the invention include hard drives, magnetic disks, optical disks, solid state memory, and web pages, and the programs contained therein. The systems and methods disclosed herein are not related to any particular computer or other apparatus, and may be implemented by any suitable combination of hardware, software, and/or firmware. For example, various general purpose machines may be used with programs written in accordance with teachings of the embodiments of the invention, or it may be more convenient to construct a specialized apparatus or system to perform the required methods and techniques Embodiments of the invention have been related to program instructions or code for performing various computer-implemented operations based on the methods and processes of the invention. The media and program instructions may be those specifically designed and constructed for the embodiments of the invention, or they may be of the kind well-known and available to those having ordinary skill in the computer software arts. Examples of program instructions include both machine code, such as produced by a computer, and files containing a high level code that can be executed by the computer using an interpreter.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of providing bulk proof of mail piece delivery receipts in a single report, the method comprising:
  receiving, from a customer, the identity of a designee to receive the single report;
  assigning an identification number to the designee;
  storing, in a digital memory, first delivery information related to a first mail piece delivery receipt for a first day, the first mail piece being from the customer to a first recipient;
  storing, in the digital memory, second delivery information related to a second mail piece delivery receipt for a second day different from the first day, the second mail piece being from the customer to a second recipient;
  extracting the first delivery information related to the first mail piece delivery receipt and the second delivery information related to the second mail piece delivery receipt from the digital memory in accordance with an extraction condition that includes the identification number of the designee;
  compiling, using a processor, the first extracted delivery information and the second extracted delivery information into the single report, the single report being for the customer; and
  delivering the single report to the designee.

2. The method of claim 1, wherein the single report is delivered through a computer network.

3. The method of claim 2, wherein the single report is placed in a computer directory available for download.

4. The method of claim 1, wherein delivering the single report comprises:
  storing the single report on a portable medium; and
  sending the portable medium to the designee.

5. The method of claim 4, wherein the portable medium comprises an optical disk.

6. The method of claim 1, wherein the extraction condition is time dependent.

7. The method of claim 6, wherein the extraction condition is the beginning of a month or the end of a month.

8. The method of claim 1, wherein the extraction condition is the completion of a request for mail piece delivery service.

9. The method of claim 1 wherein the delivery information related to the first mail piece delivery receipt and the delivery information related to the second mail piece delivery receipt comprises time, date, and location of the delivery.

10. The method of claim 1, wherein the single report includes an image of the first recipient's signature and an image of the second recipient's signature.

11. The method of claim 10, wherein the single report is encrypted.

12. The method of claim 1, wherein the single report is encrypted.

13. A system for providing bulk proof of transaction receipts in a single report, the system comprising:
   a memory for storing information related to a plurality of proof of transaction receipts, the transaction receipts including a first receipt for a first delivery from a customer to a first recipient on a first day and a second receipt for a second delivery from the customer to a second recipient on a second day; and
   a processor for:
      assigning an identification number to a designee identified by the customer,
      extracting the information related to the proof of transaction receipts from the memory in accordance with an extraction condition that includes the identification number of the designee,
      compiling the extracted proof of transaction receipt information into the single report, the single report being for the customer, and
      providing the single report to the designee.

14. The system of claim 13, further comprising means for storing the single report onto a portable medium.

15. The system of claim 14, wherein the portable medium is an optical disk.

16. The system of claim 13, further comprising means for storing the single report in a computer directory available for download.

17. The system of claim 13, wherein the single report is encrypted.

18. A system for providing bulk proof of transaction receipts in a single report, comprising:
   means for receiving, from a customer, the identity of a designee to receive the single report;
   means for assigning an identification number to the designee;
   means for storing information related to a plurality of proof of transaction receipts in a digital memory, the transaction receipts including a first receipt for a first delivery from the customer to a first recipient on a first day and a second receipt for a second delivery from the customer to a second recipient on a second day;
   means for extracting the information related to the proof of transaction receipts from the digital memory in accordance with an extraction condition that includes the identification number of the designee;
   means for compiling the extracted proof of transaction receipt information into the single report, the single report being for the customer; and
   means for providing the single report to the designee.

19. The system of claim 18, further comprising means for storing the single report onto a portable medium.

20. The system of claim 19, wherein the portable medium is an optical disk.

21. The system of claim 20, further comprising means for storing the single report in a computer directory available for download.

22. The system of claim 18, wherein the single report is encrypted.

23. A computer readable medium storing contents for causing a computer-based information handling system to perform steps for providing bulk proof of transaction receipts in a single report, the steps comprising:
   receiving, from a customer, the identity of a designee to receive the single report;
   assigning an identification number to the designee;
   storing, in a memory, delivery information related to a first mail piece delivery receipt for a first day, the first mail piece being from the customer to a first recipient;
   storing, in the memory, delivery information related to a second mail piece delivery receipt for a second day, different from the first day, the second mail piece being from the customer to a second recipient;
   extracting the delivery information related to the first mail piece delivery receipt and the delivery information related to the second mail piece delivery receipt from the memory in accordance with an extraction condition that includes the identification number of the designee;
   compiling, using a processor, the extracted delivery information into the single report, the single report being for the customer; and
   providing the single report to the designee.

* * * * *